US011836769B2

(12) United States Patent
Yee et al.

(10) Patent No.: US 11,836,769 B2
(45) Date of Patent: *Dec. 5, 2023

(54) METHODS AND SYSTEMS FOR PROVIDING ESTIMATED TRANSACTIONAL DATA

(71) Applicant: Capital One Services, LLC, McLean, VA (US)

(72) Inventors: Bryant Yee, Silver Spring, MD (US); George Bergeron, Falls Church, VA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,827

(22) Filed: Mar. 23, 2023

(65) Prior Publication Data

US 2023/0230134 A1 Jul. 20, 2023

Related U.S. Application Data

(63) Continuation of application No. 17/644,104, filed on Dec. 14, 2021, now Pat. No. 11,637,425, which is a continuation of application No. 16/991,347, filed on Aug. 12, 2020, now Pat. No. 11,233,396.

(51) Int. Cl.
*G06Q 30/0283* (2023.01)
*G06Q 50/06* (2012.01)

(52) U.S. Cl.
CPC ......... *G06Q 30/0283* (2013.01); *G06Q 50/06* (2013.01)

(58) Field of Classification Search
CPC ............... H02J 3/003; H02J 13/00001; H02J 13/00034; H02J 2203/20
See application file for complete search history.

(56) References Cited

U.S. PATENT DOCUMENTS

| | | | |
|---|---|---|---|
| 8,060,259 B2 | 11/2011 | Budhraja et al. | |
| 8,706,650 B2 | 4/2014 | Ozog | |
| 9,329,212 B2 | 5/2016 | Benes et al. | |
| 9,366,704 B2 | 6/2016 | Haghighat-Kashani et al. | |
| 10,127,568 B2 | 11/2018 | Forbes et al. | |
| 2003/0061132 A1* | 3/2003 | Yu, Sr. ................... | G06Q 30/02 705/7.34 |

(Continued)

*Primary Examiner* — Ziaul Karim
(74) *Attorney, Agent, or Firm* — Bookoff McAndrews, PLLC

(57) ABSTRACT

A computer-implemented method for providing an estimated utility expenditure to a user may include: obtaining, via one or more processors, historical transactional data of one or more customers other than the user from one or more transactional entities, wherein the historical transactional data includes: at least one address of a given customer of the one or more customers; and a historical utility expenditure associated with the at least one address; generating, via the one or more processors, a heatmap based on the historical transactional data of the one or more customers via one or more algorithms, wherein the heatmap is indicative of at least the estimated utility expenditure associated with the at least one address during a predetermined period; and causing a display of a user device associated with the user to demonstrate the heatmap.

16 Claims, 4 Drawing Sheets

(56) References Cited

U.S. PATENT DOCUMENTS

| | | | |
|---|---|---|---|
| 2009/0030752 A1* | 1/2009 | Senturk-Doganaksoy | G06Q 50/06 705/7.41 |
| 2011/0106578 A1* | 5/2011 | Cerminaro | G06Q 10/0635 705/7.28 |
| 2012/0089920 A1* | 4/2012 | Eick | G06T 11/206 715/739 |
| 2012/0143536 A1* | 6/2012 | Greaves | G06Q 40/00 702/60 |
| 2017/0018039 A1* | 1/2017 | Collum, Jr. | G06Q 30/0205 |
| 2019/0147469 A1 | 5/2019 | Hu et al. | |
| 2020/0120097 A1 | 4/2020 | Amitay et al. | |

* cited by examiner

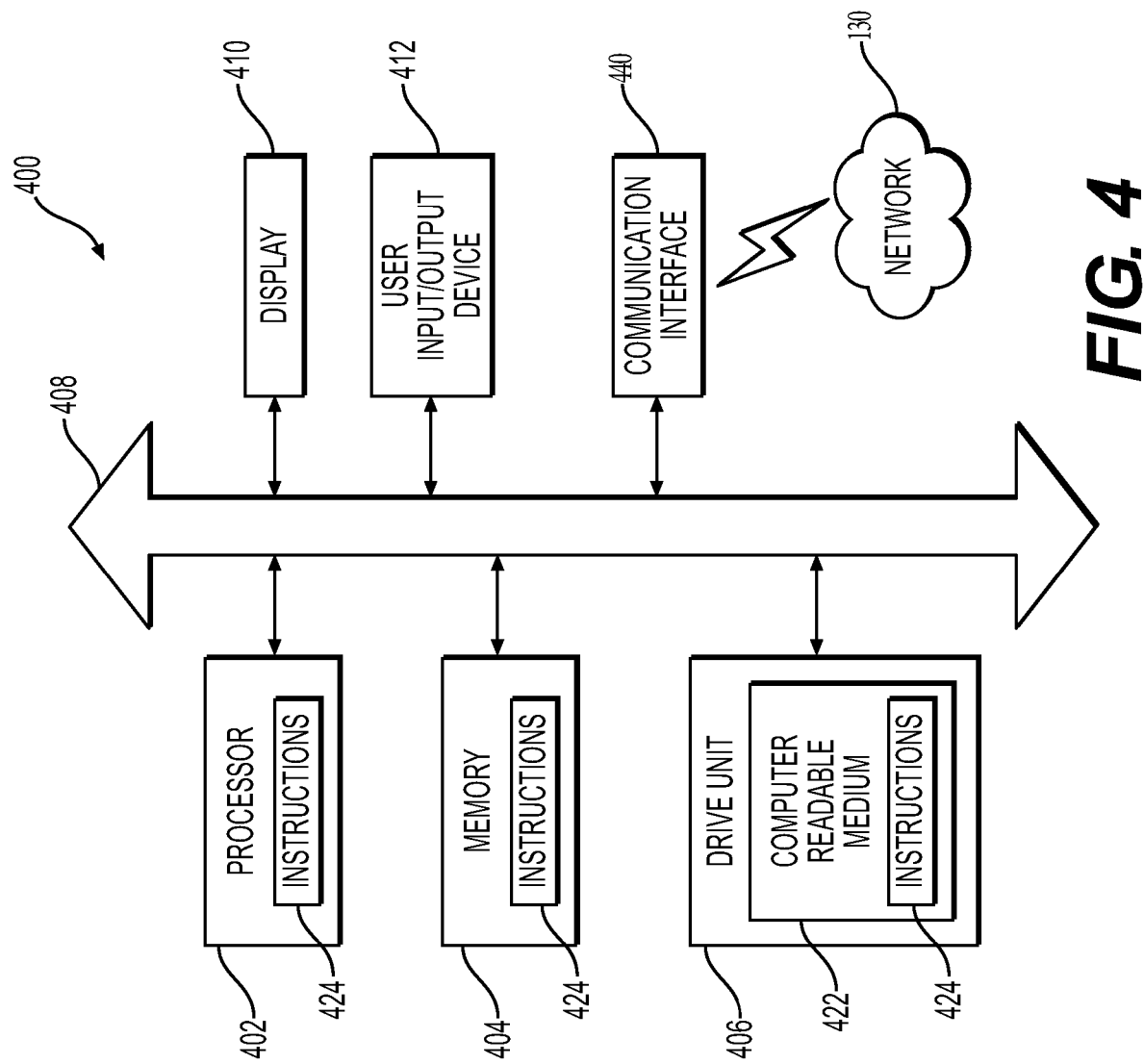

METHODS AND SYSTEMS FOR PROVIDING ESTIMATED TRANSACTIONAL DATA

CROSS-REFERENCE TO RELATED APPLICATION(S)

This patent application is a continuation of and claims the benefit of priority to U.S. Nonprovisional patent application Ser. No. 17/644,104, filed on Dec. 14, 2021, which is a continuation of U.S. Nonprovisional patent application Ser. No. 16/991,347, filed on Aug. 12, 2020, the entireties of each of which being incorporated by reference herein.

TECHNICAL FIELD

Various embodiments of the present disclosure relate generally to providing an estimated utility expenditure, and, more particularly, to providing an estimated utility expenditure based on transactional data.

BACKGROUND

Utility prices may be difficult to forecast. Customers may be surprised by utility costs after renting or purchasing a home. Customers may also be unaware when the prices for their utilities are abnormal. For example, a customer may be unaware that they are paying more for utilities than is typical for their type of property, their region, climate, or the like. While customers may seek to forecast or estimate utility costs for their property, current methods to estimate utility costs generally rely on utility rates, which may not account for a variety of factors and circumstances, and thus may not accurately predict the real cost of the utility for a certain property.

The present disclosure is directed to overcoming the above-referenced challenge. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing an estimated utility expenditure to a user. The methods and system disclosed herein may predict the real cost of the utility for certain property more accurately.

In one aspect, an exemplary embodiment of a computer-implemented method for providing an estimated utility expenditure to a user may include: obtaining, via one or more processors, historical transactional data of one or more customers other than the user from one or more transactional entities, wherein the historical transactional data includes: at least one address of a given customer of the one or more customers; and a historical utility expenditure associated with the at least one address; generating, via the one or more processors, a heatmap based on the historical transactional data of the one or more customers via one or more algorithms, wherein the heatmap is indicative of at least the estimated utility expenditure associated with the at least one address during a predetermined period; and causing a display of a user device associated with the user to demonstrate the heatmap.

In another aspect, an exemplary embodiment of a computer-implemented method for providing a utility expenditure recommendation to a user may include: obtaining, via one or more processors, historical transactional data of one or more customers other than the user from one or more transactional entities, wherein the historical transactional data includes: at least one address of a given customer of the one or more customers; and a historical utility expenditure associated with the at least one address; determining, via the one or more processors, estimated transactional data of the one or more customers other than the user based on the historical transactional data, wherein the estimated transactional data includes at least an estimated utility expenditure associated with the at least one address; generating, via the one or more processors, a heatmap based on the estimated transactional data of the one or more customers via one or more algorithms, wherein the heatmap is indicative of at least the estimated utility expenditure associated with the at least one address during a predetermined period; obtaining, via the one or more processors, transactional data of the user from the one or more transactional entities, wherein the transactional data is indicative of a financial strength of the user; determining, via the one or more processors, the utility expenditure recommendation based on the heatmap and the transactional data of the user via a trained machine learning model; and transmitting, to a user device associated with the user, a notification indicating the utility expenditure recommendation.

In a further aspect, an exemplary embodiment of a computer system for providing an estimated utility expenditure to a user may include: a memory storing instructions; and one or more processors configured to execute the instructions to perform operations including: obtaining historical transactional data of one or more customers other than the user from one or more transactional entities, wherein the historical transactional data includes: at least one address of a given customer of the one or more customers; and a historical utility expenditure associated with the at least one address; generating a heatmap based on the historical transactional data of the one or more customers via one or more algorithm, wherein the heatmap is indicative of at least the estimated utility expenditure associated with the at least one address during a predetermined period; and causing a display of a device associated with the user to demonstrate the heatmap.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts an example of a computing device, according to one or more embodiments.

DETAILED DESCRIPTION OF EMBODIMENTS

Figure 1:
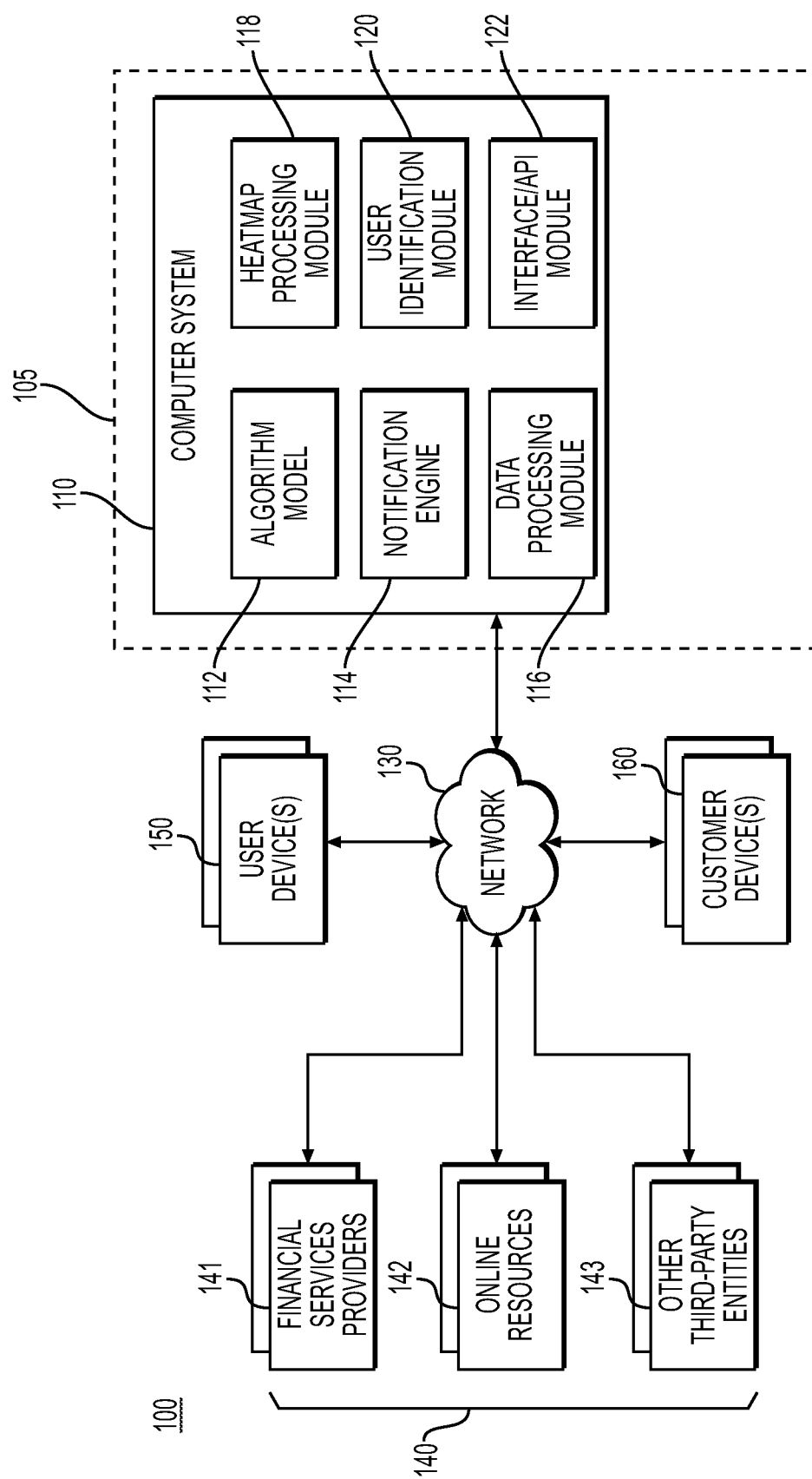
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data, such as historical transactional data and historical residence data, may be used to determine and/or generate a heatmap to a user that is representative of estimated utility expenditure at a certain property.

In an exemplary use case, a user may be interested in buying or renting real estate in a particular region. The user may access a computer system for forecasting utility expenditure in the region, e.g., via a user device associated with the user. The user may provide demographic information associated with the user. The system may use historical information about utility expenditure by various customers at various locations in the region in order to generate a heatmap of historical and/or estimated utility expenditure throughout the region. In some cases, the system may employ a machine learning model to generate the heatmap. For instance, in some cases, the machine learning model may use the demographic information associated with the user in conjunction with demographic information associated with the various customers in order to generate a heatmap indicative of utility expenditure specific to demographics correlated to the demographics of the user. The heatmap may be indicative of utility expenditure in various sub-regions of the region. The user may utilize the heatmap to determine an estimated or expected utility expenditure at various locations within the region. Because the forecast of utility expenditure is based on transactions actually paid by customers, rather than rates or rate estimates charged to customers, the forecast may be more accurate than a forecast based on rates. Further, because the forecast may be based on demographics of the customers and of the user, the forecast may account for particularities of the region (e.g., climate, culture, socio-economic trends, etc.) and/or particularities of the user (e.g., utility usage trends by the user, financial status, etc.).

In another exemplary use case, a user may own or rent real estate within a region. The user may access a computer system for forecasting utility expenditure in the region, e.g., via a user device associated with the user. The user may provide demographic information associated with the user and/or historical utility expenditure information for the user. The system may use historical information about utility expenditure by various customers at various locations in the region in order to generate a heatmap of historical and/or estimated utility expenditure throughout the region. The system and/or the user may compare the user's historical utility expenditure to the estimated and/or historical utility expenditure in the region, sub-region, address of the real-estate, etc. to determine whether the user is underpaying, overpaying, or in line with the forecast. If the user is overpaying, the system may determine and/or suggest one or more strategies for reducing the user's costs such as, for example, decreasing use of appliances or other items, changing usage patterns of appliances or other items, replacing appliances or other items, re-negotiating a utility contract, replacing a utility provider, or the like. The system and/or the user may also use the forecast to generate a budget for the user's utility expenditure for a predetermined period of time, e.g., a month, a year, etc.

FIG. 1 is a diagram depicting an example of a system environment 100 according to one or more embodiments of the present disclosure. The system environment 100 may include a computer system 110, a network 130, one or more resources 140 for collecting data (e.g., historical transactional data), and one or more user devices 150 associated with a user, and one or more customer devices 160 associated with a customer. While a customer may be a user, and vice versa, the following description is presented from the perspective of a user in conjunction with customers other than the user. In other words, from a perspective of a first person, the first person may be a user, and a second person may be a customer while, from a perspective of the second person, the second person may be the user and the first person may be the customer.

The one or more resources 140 for collecting data may include financial services providers 141, online resources 142, or other third-party entities 143. These components may be in communication with one another via network 130. The computer system 110 may have one or more processors configured to perform methods described in this disclosure. The computer system 110 may include one or more modules, models, or engines. The one or more modules, models, or engines may include an algorithm model 112, a notification engine 114, a data processing module 116, a heatmap processing module 118, a user identification module 120, and/or an interface/API module 122, which may each be software components stored in/by the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines.

In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications (e.g., a heatmap) to a user device 150 or to one or more resources 140 via network 130. The data processing module 116 may be configured to monitor, track, clean, process, or standardize data (e.g., historical transactional data) received by the computer system 110. One or more algorithms may be used to clean, process, or standardize the data. The heatmap processing module 118 may be configured to monitor, track, clean, process, or standardize the generated heatmap provided by the algorithm model 112. One or more algorithms may be used to clean, process, or standardize the generated heatmap. The user identification module 120 may manage identification data for each user accessing the computer system 110. In one implementation, the identification data associated with each user may be stored to, and retrieved from, one or more components of the data storage associated with the computer system 110 or one or more resources 140. The interface/API module 122 may allow the user to interact with one or more modules, models, or engines of the computer system 110.

Computer system 110 may be configured to receive data from other components (e.g., one or more resources 140 and/or user/customer device 150) of the system environment 100 via network 130. Computer system 110 may further be configured to utilize the received data by inputting the received data into the algorithm model 112 to produce a result (e.g., heatmap). Information indicating the result may be transmitted to user device 150 or one or more resources 140 over network 130. In some examples, the computer system 110 may be referred to as a server system that provides a service including providing the information indicating the received data and/or the result to one or more resources 140 or user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants with the ability to accept electronic payments, such as payments using credit cards and debit cards. Therefore, financial services providers 141 may collect and store data pertaining to transactions occurring at the merchants. The financial services providers 141 may include one or more databases to store historical transactional data. In some embodiment, financial services providers 141 may provide a platform (e.g., an app on a user/customer device 150) with which a user can interact. Such user interactions may provide data (e.g., historical transactional data) that may be analyzed or used in the method disclosed herein, Online resources 142 may include webpage, e-mail, apps, or social networking sites. Online resources 142 may be provided by manufacturers, retailers, consumer promotion agencies, and other entities. For example, online resources 142 may include a webpage that users can access to information regarding utility usage. Online resources 142 may include other computer systems, such as web servers, that are accessible by computer system 110.

Other third-party entities 143 may be any entity that is not a financial services provider 141 or online resources 142. For example, other third-party entities 143 may include a merchant. Other third-party entities 143 may include merchants that may each be an entity that provides products. The term "product," in the context of products offered by a merchant, encompasses both goods and services, as well as products that are a combination of goods and services. A merchant may be, for example, a utility company, a retailer, a vehicle dealer, a grocery store, an entertainment venue, a service provider, a restaurant, a bar, a non-profit organization, or other type of entity that provides products that a consumer may consume. A merchant may have one or more venues that a consumer may physically visit in order to obtain the products (goods or services) offered by the merchant. In some embodiments, other third-party entities 143 may provide a platform (e.g., an app on a user device 150) with which a user can interact. Such user interactions may provide data (e.g., historical transaction data) that may be analyzed or used in the method disclosed herein.

The financial services providers 141, the online resources 142, or any other type of third-party entities 143 may each include one or more computer systems configured to gather, process, transmit, and/or receive data. In general, whenever any of financial services providers 141, the online resources 142, or any other type of third-party entities 143 is described as performing an operation of gathering, processing, transmitting, or receiving data, it is understood that such operations may be performed by a computer system thereof. In general, a computer system may include one or more computing devices, as described in connection with FIG. 4 below.

User device 150 may operate a client program, also referred to as a user application or third-party application, used to communicate with the computer system 110. User device 150 may be used by a user or a customer other than the user. The user device 150 may employ the client program to provide information (e.g., historical transactional data) to the computer system 110 and to receive information from the computer system 110. In some examples, the client program is a mobile application that is run on user device 150. User device 150 may be a mobile device (e.g., smartphone, tablet, pager, personal digital assistant (PDA)), a computer (e.g., laptop computer, desktop computer, server), or a wearable device (e.g., smart watch). User device 150 can also include any other media content player, for example, a set-top box, a television set, a video game system, or any electronic device capable of providing or rendering data. User device 150 may optionally be portable. User device 150 may be handheld. User device 150 may be a network device capable of connecting to a network, such as network 130, or other networks such as a local area network (LAN), wide area network (WAN) such as the Internet, a telecommunications network, a data network, or any other type of network. User device 150 may be capable of transmitting information indicating a current location of user device 150 and/or an address associated with the user or the user device 150. For example, user device 150 may have an application configured to transmit data indicating a current location of user device 150 to computer system 110. User device 150 may determine a location thereof based on data obtained by a GPS included in user device 150 and/or other location estimation techniques. The computer system 110 may transmit or receive information from the user device 150 based on the location of user/customer device 150.

Computer system 110 may be part of an entity 105, which may be any type of company, organization, or institution. In some examples, entity 105 may be a financial services provider. In such examples, the computer system 110 may have access to data pertaining to transactions through a private network within the entity 105. For example if the entity 105 is a card issuer, entity 105 may collect and store historical transactional data involving a credit card or debit card issued by the entity 105. In such examples, the computer system 110 may still receive historical transactional data from other financial services providers 141.

Figure 2:
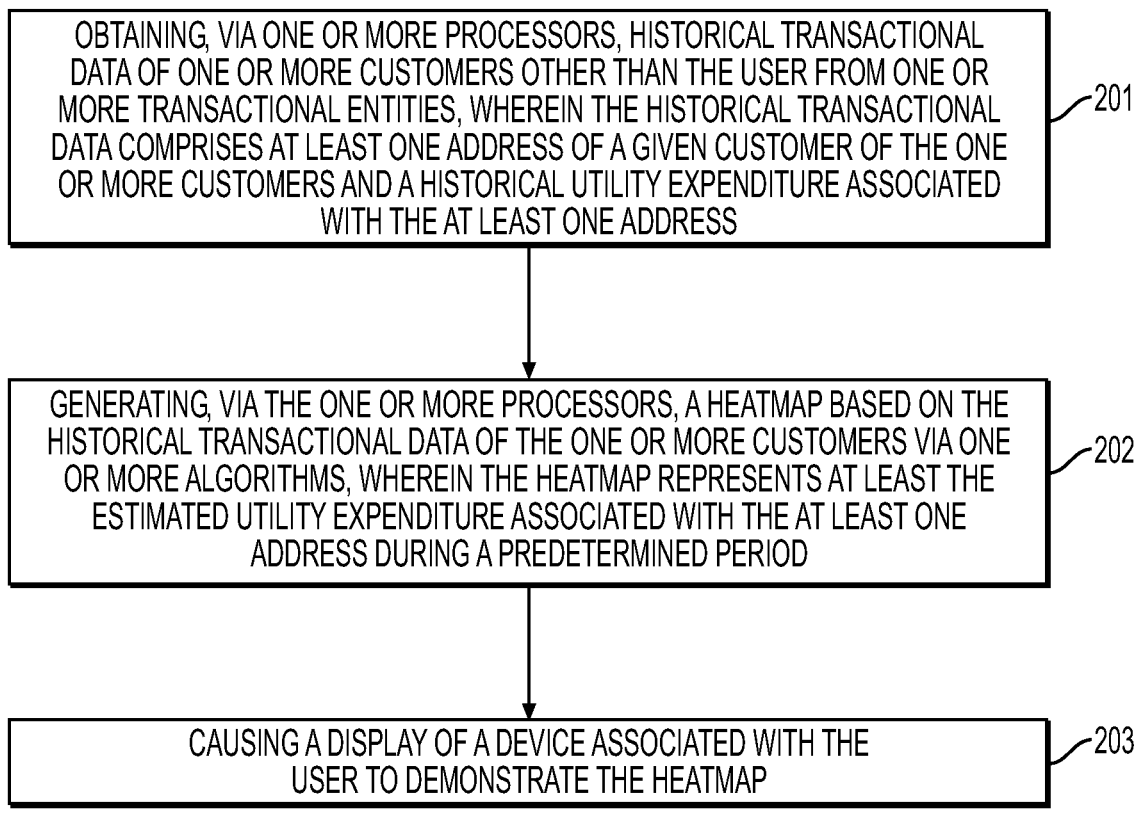
FIG. 2 depicts a flowchart of an exemplary method of providing an estimated utility expenditure to a user, according to one or more embodiments.

FIG. 2 is a flowchart illustrating a method for providing an estimated utility expenditure to a user, according to one or more embodiments. The method may be performed by computer system 110.

Step 201 may include obtaining, via one or more processors, historical transactional data of one or more customers other than the user from one or more transactional entities. The historical transactional data may include location information such as at least one address of a given customer of the one or more customers, and a historical utility expenditure associated with the at least one address. The historical transactional data may also include, for example, a customer name and/or identifier, contact information (e.g., phone numbers, e-mail addresses, etc.), demographic information (e.g., age, gender, marital status, income level, educational background, number of children in household, etc.), customer preferences (preferences for using certain type of power source, etc.), a time of a transaction, spending profile, past spending levels on goods/services sold by various manufacturers or merchants, how much the customer spends in an average transaction, or how much the customer has spent on a particular collection/category. The historical utility expenditure associated with the at least one address may include any information regarding utility expenditure associated with the at least one address, including, but not limited to, the monetary value spent for utility in a predetermined period of time (e.g., one month), or a trend of utility expenditure (e.g., utility expenditure is increasing every month, or exhibits a trend or pattern for a particular season, etc.). The historical utility expenditure may include a historical spending pattern of one or more of gas, electricity, water, sewer, or cable. The historical utility expenditure may be obtained over a period of time during which the given customer lives at the least one address. For instance, if a customer lives at one address for more than five years, the historical utility expenditure may be obtained over the five years. The historical utility expenditure may be obtained over a period of time that is less than a period of time during which the given customer lives at the least one address. For instance, if a customer lives at one address for more than five years, the historical utility expenditure may be obtained over three out of the five years. The historical utility expenditure may be obtained continuously or in a pre-determined time interval. The pre-determined time interval may be at least one day, one week, one month, one quarter or more. In some embodiments, the pre-determined time interval may be at most one quarter, one month, one week, one day or less.

The obtaining the historical transactional data of the customer may include obtaining the transactional data of the customer from a transactional entity over a network. The transactional entity may include financial services providers 141, online resources 142, or other third-party entities 143 including one or more merchants. In some embodiments, the historical transactional data may be obtained from a financial services providers 141 (e.g., a commercial bank) and not from online resources 142 or other third-party entities 143 (e.g., a utility company). For instance, the computer system 110 may obtain historical transactional data indicating payment transactions involving financial services providers 141 over a financial network. If the entity 105 operating the computer system 110 is a card issuer or other financial services provider that is involved in processing payment transactions, the computer system 110 may have access to such transactional data directly or through a private network within entity 105, and may utilize such information in addition to or alternatively to information from other financial services providers 141. In another example, the computer system 110 may obtain historical transactional data including historical utility expenditure involving a merchant (e.g., a utility company) over a network. If the entity 105 operating the computer system 110 is a financial services provider 141 that is involved in processing payment transactions and/or has a contractual relationship with the merchant to obtain such historical transaction data, the computer system 110 may have access to such historical transactional data via such contractual relationship, and may utilize such information in addition to or alternatively to information from the financial services provider 141.

In some embodiments, the historical transactional data may be anonymized. For example, in some embodiments, historical transactional data from one or more addresses within a sub-region may be disassociated from the one or more addresses and instead associated with the sub-region as a whole. The heatmap may thus be based on accurate information for each sub-region without including or being based on personally identifying information of the one or more customers.

Step 202 may include generating, via the one or more processors, a heatmap based on the historical transactional data of the one or more customers via one or more algorithms. The heatmap may be a graphical representation of historical transactional data or estimated utility expenditure where individual values of historical transactional data or estimated utility expenditure contained in a matrix are represented as one or more color schemes. Such a matrix may represent a map of geographical locations and different colors schemes on the matrix may represent different values of historical transactional data and/or estimated utility expenditure in different geographical locations (e.g., different addresses, sub-regions, regions, etc.). One or more color schemes can be used to illustrate the heatmap. Such color schemes may include black, white, gray, blue, red, pink, yellow, green, orange, or purple. The one or more algorithms may clean, manage, translate, standardize, and/or organize the historical transactional data of the one or more customers to be presented as a heatmap. For example, the one or more algorithms can organize the historical transactional data so that the heatmap is indicative of the historical transactional data at any given point of time (e.g., a historical utility expenditure on Mar. 1, 1990) within a geographic area. In another example, the one or more algorithms may standardize the historical transactional data so that the historical transactional data is the same type (e.g., changing "100 pounds per month" to "130 dollars per month").

The heatmap may be indicative of at least the estimated utility expenditure associated with the at least one address, sub-region, and/or region during a predetermined period. Such estimated utility expenditure may be obtained via a trained machine learning algorithms. Details of the trained machine learning algorithms are described elsewhere herein. The predetermined period may be at least one day, one week, one month, one quarter or longer. In some embodiments, the predetermined period may be at most one quarter, one month, one week, one day, or shorter. The heatmap may further represent the historical utility expenditure associated with the at least one address. For instance, the heatmap may represent a historical utility expenditure within a city. In this situation, the area of the heatmap may represent the area of the city, and the one or more color schemes on the heatmap may be indicative of the historical utility expenditure at a specific address, location, sub-region, or region in the city at a specific time.

In one example, to see historical utility expenditure at a specific address in the city at another point of time, the user may interact with the heatmap to search for the historical utility expenditure at the specific address at another point of time. In some instances, the color scheme on the heatmap may be different from the color scheme on the heatmap representing historical utility expenditure at a specific address in the city at the specific time.

Prior to generating the heatmap, or at any stage of providing an estimated utility expenditure to a user, the method may include obtaining historical residence data associated with the at least one address based on the historical transactional data. The historical residence data may include residence demographic information and/or residence behavior regarding one or more individuals associated with the at least one address. Residence demographic information may include any information race, age, gender, marital status, income level, educational background, or number of children in household regarding the residents living at the at least one address. Residence behavior may include any behavior or habit of the residents living at the at least one address, including, but not limited to, a time schedule during weekday and weekends (e.g., when the resident is going to work), a preferred room temperature, or a preferred cooking method (e.g., using oven). Residents may be a customer other than the user or the user, e.g., depending on whether the selected address is associated with the user. The historical residence data may further include property improvement data associated the at least one address. Such property improvement data may include any information related to improvement done on the property which may result in change of utility expenditure, including, but not limited to, renovation of the kitchen, a new paint color that changes an absorption or reflection of heat, or solar panels on the roof.

Prior to generating the heatmap, at any stage of providing an estimated utility expenditure to a user, the method may further include obtaining user residence data of the user via the device 150 associated with the user. The user residence data may include user demographic information and/or user residence behavior of the user. The user demographic information may include any information race, age, gender, marital status, income level, educational background, or number of children in household regarding the user living an address associated with the user and/or the user device 150. User behavior may include any behavior or habit of the user living at the address, including, but not limited to, a time schedule during weekday and weekends (e.g., when the user is going to work), a preferred room temperature, or a preferred cooking method (e.g., using oven). The user residence data may further include property improvement data associated the address associated with the user. Such property improvement data may include any information related to improvement done on the property which may result in change of utility expenditure, including, but not limited to, renovation of the kitchen, new painting, or solar panels on the roof.

The generating the heatmap may further include generating the heatmap based on the historical residence data of the one or more customers via the one or more algorithms. The generating the heatmap may further include generating the heatmap based on the historical residence data and the user residence data via the one or more algorithms. The one or more algorithms may clean, manage, translate, standardize, and/or organize the historical residence data and/or user residence data. For example, the one or more algorithms can organize the historical residence data and/or the user residence data so that the heatmap can represent the historical residence data at any given point of time (e.g., a historical utility expenditure on Mar. 1, 1990) within a geographic area.

The one or more algorithms may include a trained machine learning algorithm. The trained machine learning algorithm may include a regression-based model that accepts the historical transactional data, the historical residence data, the user residence data, and/or heatmap as input data. For example, the historical residence data and the addresses associated with the historical transaction data may be used as training data, and the historical utility expenditure associated with the historical transaction data may be used as ground truth for the training data that is usable to train the machine learning algorithm to determine an estimate for utility expenditure based on a given address and given residence data.

The trained machine learning algorithm may be part of the algorithm model 112. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through the connections' weight. The trained machine learning algorithm may include a convolutional neural network (CNN), a deep neural network, or a recurrent neural network (RNN).

A CNN may be a deep and feed-forward artificial neural network. A CNN may be applicable to analyzing visual images, such as the heatmap, described elsewhere herein. A CNN may include an input layer, an output layer, and multiple hidden layers. Hidden layers of a CNN may include convolutional layers, pooling layers, or normalization layers. Layers may be organized in three dimensions: width, height, and depth. The total number of convolutional layers may be at least about 3, 4, 5, 10, 15, 20 or more. The total number of convolutional layers may be at most about 20, 15, 10, 5, 4, or less.

Convolutional layers may apply a convolution operation to an input and pass results of a convolution operation to a next layer. For processing images, a convolution operation may reduce the number of free parameters, allowing a network to be deeper with fewer parameters. In a convolutional layer, neurons may receive input from only a restricted subarea of a previous layer. A convolutional layer's parameters may comprise a set of learnable filters (or kernels). Learnable filters may have a small receptive field and extend through the full depth of an input volume. During a forward pass, each filter may be convolved across the width and height of an input volume, compute a dot product between entries of a filter and an input, and produce a 2-dimensional activation map of that filter. As a result, a network may learn filters that activate when detecting some specific type of feature at some spatial position as an input.

An RNN may be configured to receive sequential data (e.g., historical utility expenditure) as an input, such as consecutive data inputs, and the RNN may update the internal state at every time step. An RNN can be applicable to tasks such as image captioning or time series anomaly detection. The RNN may include a fully recurrent neural network, independently recurrent neural network, Jordan networks, Echo state, neural history compressor, gated recurrent unit, multiple timescales model, differentiable neural computer, or any combination thereof.

The trained machine learning algorithm may compute the estimated utility expenditure as a function of the historical transactional data, the historical residence data, the user residence data, and/or heatmap, or one or more variables indicated in the input data. The one or more variables may be derived from the historical transactional data, the historical residence data, the user residence data, and/or heatmap. This function may be learned by training the machine learning algorithm with training sets.

In some embodiments, the method may optionally include training the machine learning algorithm. The machine learning algorithm may be trained by supervised, unsupervised, or semi-supervised learning using training sets comprising data of types similar to the type of data used as the model input. For example, the training set used to train the model may include any combination of the following: the historical transactional data of customers other than the user, the historical residence data of customers other than the user, a heatmap associated with customers other than the user, and/or the estimated utility expenditure associated with customers other than the user. Additionally, the training set used to train the model may further include customer data, including, but not limited to, demographic information of the customer or other data related to the customer. Accordingly, the machine learning model may be trained to map input variables to a quantity or value of an estimated utility expenditure for the user. That is, the machine learning model may be trained to determine a quantity or value of the estimated utility expenditure of the user as a function of various input variables.

Step 203 may include demonstrating the heatmap on a display of the user device 150 and/or causing the user device 150 to demonstrate the heatmap. The heatmap may include any information associated with the historical or estimated utility expenditure. The heatmap may be configured to be displayed on a display screen of a device associated with the user. The heatmap may be displayed on the display screen in any suitable form, such as an e-mail, a text message, a push notification, content on a web page, and/or any form of graphical user interface. The user device 150 may be capable of accepting inputs of the user via one or more interactive components of the user device 150, such as a keyboard, button, mouse, touchscreen, touchpad, joystick, trackball, camera, microphone, or motion sensor. The inputs of the user may include any communication between the user and the computer system 110. The inputs of the user may include any communication to adjust the consumption of utility. For instance, after noticing the estimated utility expenditure is too high, the user may communicate with a smart utility management application to adjust the consumption of utility in the house. The inputs of the user may include any communication to adjust the price of utility. For instance, after noticing the estimated utility expenditure is too high, the user may communicate with the smart utility management application to switch to another utility company.

At any stage of providing an estimated utility expenditure, there may be a step of authenticating the user based on identification data of the user. The authenticating the user may include comparing the identification data of the user to a prestored identification. During the authenticating process, one or more algorithms may be used to compare the identification data of the user to a prestored identification and determine whether there is a match (e.g., a complete match or a match equal to or exceeding a predetermined threshold of similarity) between the identification data of the user and a prestored identification. Providing an estimated utility expenditure may be permitted to be completed, may be stopped, or may require additional verification processes to occur, based on whether there is a match between the identification data of the user and a prestored identification. The identification data may include at least a password, a user name, or biometric data of the user. The biometric data of the user may include any information related to human characteristics of the user. The biometric data may include physiological information such as a fingerprint, palm veins, face recognition, DNA, palm print, hand geometry, iris recognition, retina, or odor/scent. The biometric data may also include behavioral characteristics related to the pattern of behavior of the user, including but not limited to typing rhythm, gait, or voice. The identification data of the user may further include an actual name, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user.

The prestored identification may be generated when a user device 150 is registered with a transaction system, an authentication system, or a transactional entity. In other embodiments, the prestored identification may be generated when a user device 150 first connects with a transaction system, an authentication system, or a transactional entity 141 (e.g., a financial service provider, a merchant). If the user device 150 is an electronic mobile device, the prestored identification may be generated when a mobile application for authenticating identification is downloaded, installed, or running on the user device 150 for the first time. The prestored identification may be generated when a user account is registered with a transaction system, an authentication system, or a transaction entity, and the prestored identification may correspond to the user/customer device (e.g., user device 150) used for registration of the user account. Once the prestored identification has been generated, it may be stored with other user account information and/or authentication information. The prestored identification may be stored in one or more memory units, cookies, caches, browsing histories, and/or browser fingerprints.

Although several embodiments disclose demonstrating the historical and/or predicted utility expenditure as a heatmap, it should be understood that such embodiments are exemplary, and that other embodiments may employ other representations of the historical and/or predicted utility expenditure. Other examples of such a demonstration include but are not limited to a chart, a graph, a numerical notification, or the like. In some embodiments, a demonstration may be based on information associated with a heatmap. For example, a graphic such as a dollar sign, lightning bolt or the like may be depicted over each residence, region, or the like on a geographical map, whereby the graphic has a color, size, or the like based on data from the heatmap.

Figure 3:
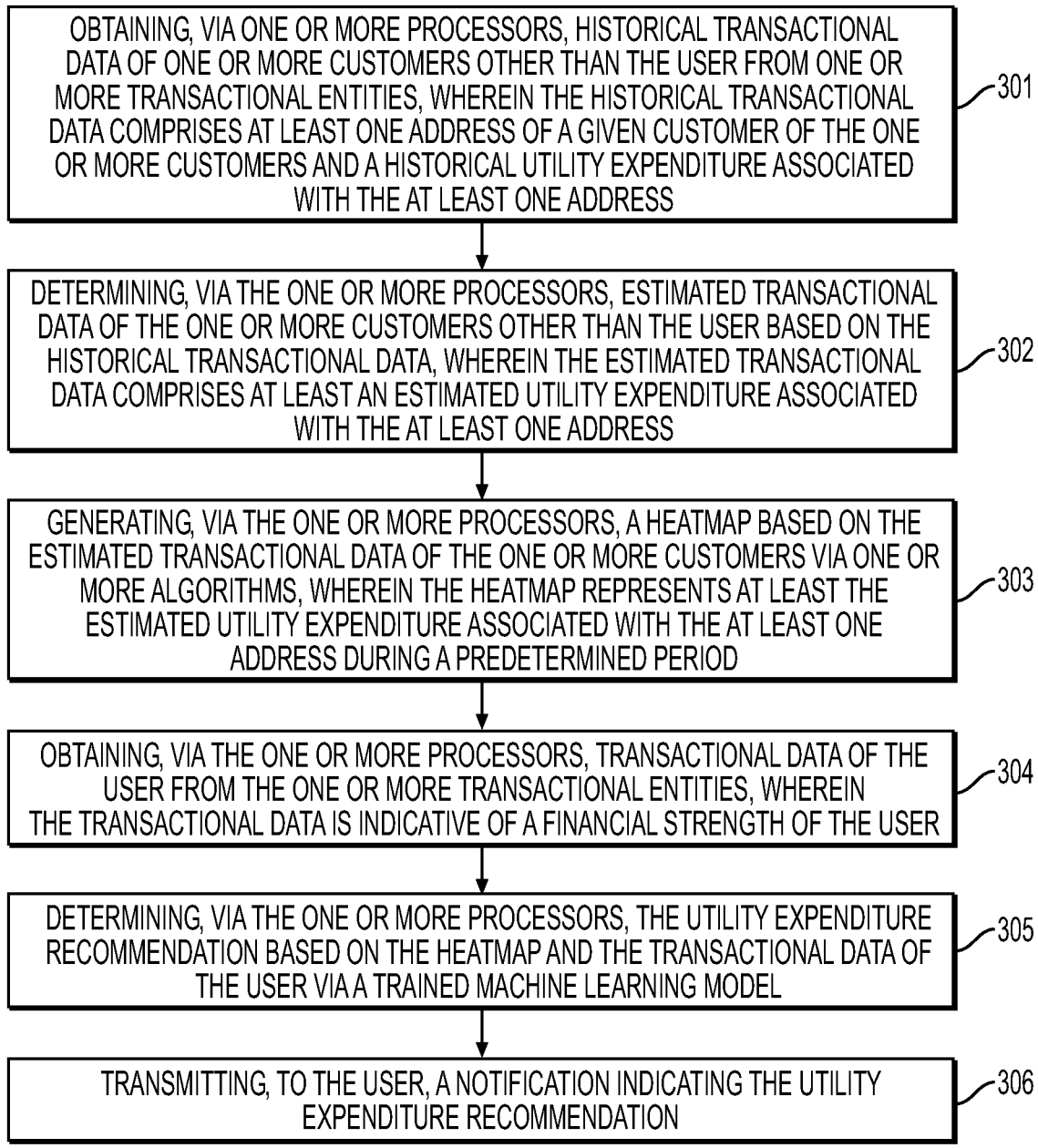
FIG. 3 depicts a flowchart of another exemplary method of providing an estimated utility expenditure to a user, according to one or more embodiments.

FIG. 3 is a flowchart illustrating another exemplary method for providing a utility expenditure recommendation to a user, according to one or more embodiments of the present disclosure. The method may be performed by computer system 110.

Step 301, similar to step 201, may include obtaining, via one or more processors, historical transactional data of one or more customers other than the user from one or more transactional entities. The historical transactional data may include at least one address of a given customer of the one or more customers and a historical utility expenditure associated with the at least one address. The one or more transactional entities may include one or more merchants, financial services providers 141, online resources 142, or other third party entities 143. The historical transactional data may further include customer demographic data of the given customer associated with the at least one address. The customer demographic data may include age, gender, race, ethnicity, marital status, income level, educational background, or number of children in household of the given customer associated with the at least one address. The historical utility expenditure may include a historical spending pattern of gas, electricity, water, or cable. Further details of the historical transactional data, historical utility expenditure, customer demographic data, and historical spending pattern are described elsewhere herein.

Step 302 may include determining, via the one or more processors, estimated transactional data of the one or more customers other than the user based on the historical transactional data. The estimated transactional data may include estimated customer preferences (e.g., possible preferences for using certain type of power source, etc.), estimated time of a transaction (e.g., future time to pay a utility bill), or estimated spending profile (e.g., future spending habits such as how much to spend every week on grocery). The estimated transactional data may include at least an estimated utility expenditure associated with the at least one address. The estimated utility expenditure may be any future utility expenditure associated with the at least one address. The estimated utility expenditure may include an estimated spending pattern of one or more of gas, electricity, water, or cable. The estimated utility expenditure associated with the at least one address may include any information regarding estimated utility expenditure associated with the at least one address, including, but not limited to, the estimated monetary value spent for utility in a predetermined period of time (e.g., one month), an estimated trend of utility expenditure (e.g., utility expenditure is increasing every month), or an estimated preferred utility type (e.g., electric power).

The estimated transactional data and/or estimated spending pattern may be determined via one or more algorithms including a trained machine learning algorithm. The trained machine learning model may be trained to map input variables to a quantity or value of the estimated transactional data and/or estimated spending pattern. That is, the machine learning model may be trained to determine a quantity or value of the estimated transactional data and/or estimated spending pattern as a function of various input variables. The input variables may include historical transactional data of one or more customers other than the user. The estimated transactional data and/or estimated spending pattern determined by the machine learning model may be used as an additional input variable.

Step 303 may include generating, via the one or more processors, a heatmap based on the estimated transactional data of the one or more customers via one or more algorithms. The heatmap may be indicative of at least the estimated utility expenditure associated with the at least one address during a predetermined period. The heatmap may further be indicative of the estimated transactional data associated with the at least one address. The heatmap may be a graphical representation of estimated transactional data or estimated utility expenditure where individual values of estimated transactional data or estimated utility expenditure contained in a matrix are represented as one or more color schemes. Such a matrix may represent a map of a geographical location and different colors schemes on the matrix may represent different values of estimated transactional data or estimated utility expenditure in different geographical locations (e.g., different addresses). One or more color schemes can be used to illustrate the heatmap. Such color schemes may include black, white, gray, blue, red, pink, yellow, green, orange, or purple. The one or more algorithms may clean, manage, translate, standardize, and/or organize the estimated transactional data of the one or more customers to be presented as a heatmap. For example, the one or more algorithms can organize the estimated transactional data so that the heatmap can represent the estimated transactional data at any given point of time (e.g., an estimated utility expenditure on Mar. 1, 2030) within a geographic area. In another example, the one or more algorithms may standardize the estimated transactional data so that the estimated transactional data is the same type (e.g., changing "100 pounds per month" to "130 dollars per month").

The heatmap may represent at least the estimated utility expenditure associated with the at least one address during a predetermined period. Such estimated utility expenditure may be obtained via a trained machine learning algorithm. Details of the trained machine learning algorithm(s) are described elsewhere herein. The predetermined period may be at least one day, one week, one month, one quarter or longer. In some embodiments, the predetermined period may be at most one quarter, one month, one week, one day, or shorter. The heatmap may further represent the estimated utility expenditure associated with the at least one address. For instance, the heatmap may represent an estimated utility expenditure within a city. In this situation, the area of the heatmap may represent the area of the city, and the one or more color schemes on the heatmap may represent estimated utility expenditure at a specific address in the city at a specific time. If a user wants to see the estimated utility expenditure at a specific address in the city at another point of time, the user may need to interact with the heatmap to search for the estimated utility expenditure at the specific address at another point of time, and in this case, the color scheme on the heatmap may be different from the color scheme on the heatmap representing the estimated utility expenditure at a specific address in the city at the specific time.

Step 304 may include obtaining, via the one or more processors, transactional data of the user from the one or more transactional entities. The transactional data of the user may include a transactional time and a transactional location. The transactional time may include a time range initiating before a start time of the transaction and terminating after an end time of the transaction. The transactional location may include a geographic region surrounding the transaction. The transactional data may further include the cost of the one or more transactions or any information related to the one or more transactions or the user, including, but not limited to, an identification of the user, an income range of the user, a user purchase preference (e.g., preferences or reviews regarding favorite products and/or services, favorite department stores, etc.), and/or a transaction history of the user. The transaction history of the user may include a time of a prior transaction, a location of a prior transaction, spending profile of a user, incentives for user's prior transactions, past spending levels on goods sold by various manufacturers or merchants, a frequency of shopping by the user at one or more retail outlets, how much the user spends in an average transaction, or how often the user shops in a particular store. The transactional data may include at least one of a salary or a spending pattern of the user. The transactional data may be indicative of a financial strength of the user. The financial strength of the user may include at least one of a net income (e.g., a net monthly income), or a monthly expenditure. The net monthly income may be the monetary value that is equal to the monthly income of the user minus the monthly expenditure of the user. The monthly expenditure of the user may include any expenditure of the user during a month, including a debt or a loan of the user. In some embodiments, financial services providers 141 may provide a smart financial assistant (e.g., an app or platform that a user can interact with) to help a user save and/or control the user's expenditure. In this situation, data (e.g., transactional data) obtained via the smart financial assistant may be used and/or analyzed to determine the financial strength of the user. The financial strength of the user may further include, or may be determined by, demographic information of the user. The demographic information may include age, gender, race, ethnicity, marital status, income level, educational background, or number of children in household. One or more algorithms may be used to determine the financial strength of the user. Details of the one or more algorithms are described elsewhere herein.

Step 305 may include determining, via the one or more processors, the utility expenditure recommendation based on the heatmap and the transactional data of the user via a trained machine learning model. The utility expenditure recommendation may include any information regarding current and/or future utility expenditure for a user. The utility expenditure recommendation may include a recommended period of time for using a utility, a recommended type of utility (e.g., solar energy), a recommended way to lower the cost of a utility (e.g., changing to another utility company or improving the house for lower utility costs), or a recommended schedule of living for a user (e.g., when to initiate a utility setting for when the user is away or asleep). The utility expenditure recommendation may also include any information regarding the one or more utility companies, including, but not limited to, the names of the utility companies, contact information of the utility companies, prices provided by the utility companies, or the addresses of the utility companies. The utility expenditure recommendation may also include any information pertaining to utility expenditure savings, including, but not limited to, discounts on products for housing improvement, news articles pertaining to utility expenditure savings, or possible substitutes or compatible items for a utility, and so forth.

The trained machine learning algorithm may compute the utility expenditure recommendation of the user as a function of the heatmap associated with the one or more customers other than the user, historical transactional data of the one or more customers other than the user, estimated transactional data of the one or more customers other than the user, transactional data of the user, or one or more variables indicated in the input data. The one or more variables may be derived from the heatmap associated with the one or more customers other than the user, historical transactional data of the one or more customers other than the user, estimated transactional data of the one or more customers other than the user, and/or transactional data of the user. This function may be learned by training the machine learning algorithm with training sets.

The machine learning algorithm may be trained by supervised, unsupervised, or semi-supervised learning using training sets comprising data of types similar to the type of data used as the model input. For example, the training set used to train the model may include any combination of the following: the transactional data of the user, estimated transactional data of the one or more customers other than the user, historical transactional data of one or more customers other than the user, heatmap generated associated with the one or more customers other than the user, and/or the utility expenditure recommendation to one or more customers other than the user. Additionally, the training set used to train the model may further include user/customer data, including, but not limited to, an actual name, contact information (e.g., address, phone numbers, e-mail addresses, etc.), and other data related to the user/customer. Accordingly, the machine learning model may be trained to map input variables to a quantity or value of utility expenditure recommendation for the user. That is, the machine learning model may be trained to determine a quantity or value of the utility expenditure recommendation of the user as a function of various input variables.

Step 306 may include transmitting, to the user, a notification indicating the utility expenditure recommendation. The notification may include any information associated with the utility expenditure recommendation. The notification may be configured to be displayed on a display screen of the user device 150). The notification may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor. The inputs of the user may include any communication between the user and the computer system 110. The inputs of the user may include accepting or rejecting the utility expenditure recommendation. The inputs of the user may include any communication to adjust the consumption of utility based on the utility expenditure recommendation. For instance, after reviewing the utility expenditure recommendation, the user may communicate with a smart utility management application to adjust the consumption of a utility in the house. The inputs of the user may include any communication to adjust the price of a utility. For instance, after reviewing the utility expenditure recommendation, the user may communicate with the smart utility management application to switch to another utility company.

At any stage of providing an estimated utility expenditure to a user, the method may further include obtaining real-time utility expenditure of the user. The real-time utility expenditure may include any information regarding current utility expenditure. The real-time utility expenditure may include a real-time spending pattern of gas, electricity, water, or cable. The real-time utility expenditure may include any information regarding real-time utility expenditure associated with the at least one address associated with the user and/or the user device 150, including, but not limited to, the real-time monetary value spent for a utility in a predetermined period of time (e.g., one month), a real-time trend of utility expenditure (e.g., utility expenditure is increasing every month), or a real-time preferred utility type (e.g., electric power).

The method may further include transmitting a warning to the user if the real-time utility expenditure of the user is larger than the estimated utility expenditure or a predetermined utility expenditure. The predetermined utility expenditure may be higher or lower than the estimated utility expenditure. The warning may include any information about the real-time utility expenditure of the user that is larger than the estimated utility expenditure, or a recommendation to lower the utility expenditure. The warning may be configured to be displayed on a display screen of the user device 150. The warning may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor. The inputs of the user may include any communication between the user and the computer system 110. The inputs of the user may include any communication to adjust the consumption of utility based on the warning.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, user device 150, and/or customer device 160, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

FIG. 4 illustrates an example of a computing device 400 of a computer system, such as computer system 110 and/or user/customer device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure.

What is claimed is:

1. A computer-implemented method for estimating utility transaction data, comprising:
    obtaining, via one or more processors and from one or more transactional entities, historical utility transactional data of one or more customers associated with an address within a geographical region, the geographical region including a plurality of sub-regions;
    generating anonymized historical utility transactional data by:
        disassociating the historical utility transactional data of each customer from the address of the customer; and
        associating the historical utility transactional data of each customer with a sub-region of the geographical region that includes the address of the customer;
    determining, via the one or more processors and based on the anonymized historical utility transactional data, estimated transactional utility data of each sub-region, wherein:
        the estimated transactional utility data is determined based on one or more historical heatmaps of the anonymized historical utility transactional data; and
        determining the estimated transactional utility data includes using a trained machine-learning model that has been trained, based on sequences of training heatmaps, to generate a forecast heatmap in response to input of the one or more historical heatmaps;
    generating, via the one or more processors and based on the determined estimated utility transactional data of the sub-regions, a heatmap indicative of the geographical region and of estimated utility transactional data corresponding to the sub-regions;
    causing, via the one or more processors, a display of a computer system to output the generated heatmap via a graphical user interface;
    receiving, via the graphical user interface, a user interaction specifying at least one of a specific address or a specific sub-region; and
    in response to receiving the user interaction, causing an update of the output of the heatmap based on the at least one specific address or specific sub-region.

2. The computer-implemented method of claim 1, further comprising:
    receiving, from the graphical user interface, historical utility transactional data of a user associated with the specific address or specific sub-region;
    comparing the received historical utility transactional data of the user with the estimated utility transactional data corresponding to the specific sub-region or a sub-region including the specific address;
    generating an indication based on the comparing; and
    causing the graphical user interface to output the indication.

3. The computer-implemented method of claim 2, wherein the indication includes a strategy for reducing a utility cost of the user.

4. The computer-implemented method of claim 2, wherein the indication includes a utility cost budget for the user for a predetermined period of time.

5. The computer-implemented method of claim 1, wherein the trained machine-learning model includes one or more of a convolutional neural network or a recurrent neural network.

6. The computer-implemented method of claim 1, wherein estimated transactional utility data is a future utility cost forecast.

7. The computer-implemented method of claim 6, further comprising:
    receiving, via the graphical user interface, one or more of a future point in time or a forecast period; and
    determining, based on the future utility cost forecast, a utility cost one or more of at the future point in time or over the forecast period.

8. The computer-implemented method of claim 1, wherein:
    the historical utility transactional data of the one or more customers includes one or more of demographic data or behavior data;
    the computer-implemented method further comprises obtaining one or more demographic data or behavior data of a user; and
    the estimated transactional utility data is determined based on the demographic data or behavior data of the user and of the one or more customers.

9. A system for estimating utility transaction data, comprising:
    at least one memory storing instructions and a trained machine-learning model that has been trained, based on sequences of training heatmaps, to generate a forecast heatmap in response to input of one or more historical heatmaps; and
    at least one processor operatively connected to the at least one memory, and configured to execute the instructions to perform operations, including:
        obtaining, from one or more transactional entities, historical utility transactional data of one or more customers associated with an address within a geographical region, the geographical region including a plurality of sub-regions;
        generating anonymized historical utility transactional data by:
            disassociating the historical utility transactional data of each customer from the address of the customer; and
            associating the historical utility transactional data of each customer with a sub-region of the geographical region that includes the address of the customer;
        determining, based on the anonymized historical utility transactional data, estimated transactional utility data of each sub-region, wherein:
            the estimated transactional utility data is determined based on the one or more historical heatmaps of the anonymized historical utility transactional data; and
            determining the estimated transactional utility data includes using the trained machine-learning model;
        generating, based on the determined estimated utility transactional data of the sub-regions, a heatmap indicative of the geographical region and of estimated utility transactional data corresponding to the sub-regions;

causing a display of a computer system to output the generated heatmap via a graphical user interface;

receiving, via the graphical user interface, a user interaction specifying at least one of a specific address or a specific sub-region; and in response to receiving the user interaction, causing an update of the output of the heatmap based on the at least one specific address or specific sub-region.

10. The system of claim 9, wherein the operations further include:

receiving, from the graphical user interface, historical utility transactional data of a user associated with the specific address or specific sub-region;

comparing the received historical utility transactional data of the user with the estimated utility transactional data corresponding to the specific sub-region or a sub-region including the specific address;

generating an indication based on the comparing; and causing the graphical user interface to output the indication.

11. The system of claim 10, wherein the indication includes one or more of a strategy for reducing a utility cost of the user or a utility cost budget for the user for a predetermined period of time.

12. The system of claim 9, wherein the trained machine-learning model includes one or more of a convolutional neural network or a recurrent neural network.

13. The system of claim 9, wherein estimated transactional utility data is a future utility cost forecast.

14. The system of claim 13, wherein the operations further include:

receiving, via the graphical user interface, one or more of a future point in time or a forecast period; and determining, based on the future utility cost forecast, a utility cost one or more of at the future point in time or over the forecast period.

15. The system of claim 9, wherein:

the historical utility transactional data of the one or more customers includes one or more of demographic data or behavior data;

the operations further include obtaining one or more demographic data or behavior data of a user; and the estimated transactional utility data is determined based on the demographic data or behavior data of the user and of the one or more customers.

16. A computer-implemented method for estimating utility transaction data, comprising:

obtaining, via one or more processors and from one or more transactional entities, historical utility transactional data of one or more customers associated with an address within a geographical region, the geographical region including a plurality of sub-regions;

generating anonymized historical utility transactional data by:

disassociating the historical utility transactional data of each customer from the address of the customer; and associating the historical utility transactional data of each customer with a sub-region of the geographical region that includes the address of the customer;

determining estimated transactional utility data of each sub-region by inputting one or more historical heatmaps of the anonymized historical utility transactional data into a trained-machine learning model that has been trained, based on sequences of training heatmaps, to generate a forecast heatmap in response to input of the one or more historical heatmaps;

generating, via the one or more processors and based on the determined estimated utility transactional data of the sub-regions, a heatmap indicative of the geographical region and of estimated utility transactional data corresponding to the sub-regions;

causing, via the one or more processors, a display of a computer system to output the generated heatmap via a graphical user interface;

receiving, via the graphical user interface, a user interaction specifying at least one of a specific address or a specific sub-region; and in response to receiving the user interaction, causing an update of the output of the heatmap based on the at least one specific address or specific sub-region.

* * * * *